United States Patent
Chen

(10) Patent No.: US 12,259,974 B2
(45) Date of Patent: Mar. 25, 2025

(54) PROCESSING METHOD AND APPARATUS FOR DEFENDING AGAINST SHARED STORAGE SIDE CHANNEL ATTACKS, AND ELECTRONIC DEVICE

(71) Applicant: Beijing ESWIN Computing Technology Co., Ltd., Beijing (CN)

(72) Inventor: Weijie Chen, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 253 days.

(21) Appl. No.: 18/080,085

(22) Filed: Dec. 13, 2022

(65) Prior Publication Data

US 2023/0185911 A1 Jun. 15, 2023

(30) Foreign Application Priority Data

Dec. 14, 2021 (CN) .......................... 202111530184.9

(51) Int. Cl.
G06F 21/55 (2013.01)
(52) U.S. Cl.
CPC ...... G06F 21/556 (2013.01); *G06F 2221/034* (2013.01)
(58) Field of Classification Search
CPC .................... G06F 21/556; G06F 2221/034
See application file for complete search history.

(56) References Cited

U.S. PATENT DOCUMENTS

| 10,311,229 B1 * | 6/2019 | Pohlack | G06F 9/45558 |
| 11,456,855 B2 * | 9/2022 | Weiner | H04L 9/0872 |
| 2019/0165928 A1 * | 5/2019 | Susella | G06F 21/44 |

(Continued)

FOREIGN PATENT DOCUMENTS

| CN | 107622199 A | 1/2018 |
| CN | 110032867 A | 7/2019 |

(Continued)

OTHER PUBLICATIONS

Kocher et al., "Spectre Attacks: Exploiting Speculative Execution", Communications of the ACM, Retrieved from https://dl.acm.org/doi/pdf/10.1145/3399742, Published Jul. 2020 (Year: 2020).*

(Continued)

*Primary Examiner* — Chau Le
(74) *Attorney, Agent, or Firm* — Ladas & Parry, LLP

(57) ABSTRACT

Embodiments of the present application provide a processing method and apparatus for defending against shared storage side channel attacks, an electronic device and a computer-readable storage medium, and relate to the technical field of computers. In the embodiment of the present application, first time information is acquired by a clock thread, and the first time information is obfuscated to obtain second time information; and, the second time information is transmitted to an attack thread by a clock thread. Since the second time information acquired by the attack thread is obfuscated, that is, the second time information is inaccurate, the attack thread cannot successfully complete a side channel attack when it performs side channel attacks based on the inaccurate time information, so that the system can be protected.

18 Claims, 6 Drawing Sheets

(56) References Cited

U.S. PATENT DOCUMENTS

2021/0064370 A1* 3/2021 Teranishi ................ G06F 21/54
2021/0160690 A1* 5/2021 Fröhlich ............... H04W 12/35

FOREIGN PATENT DOCUMENTS

CN            111865909 A    10/2020
WO    WO-2015191239 A1 * 12/2015  ........... G06F 21/556
WO         2020071976 A1     4/2020

OTHER PUBLICATIONS

Datta R, Zhao G, Basu K, Shamsi K. A Security Analysis of Circuit Clock Obfuscation. Cryptography. 2022; 6(3):43. https://doi.org/10.3390/cryptography6030043 (Year: 2022).*

Search Report dated Dec. 20, 2022 from the Office Action for Chinese Application No. 202111530184.9 issued Jan. 4, 2023, 2 pages.

Search Report dated Nov. 3, 2022 from the Office Action for Chinese Application No. 202111530184.9 issued Nov. 16, 2022, 2 pages.

* cited by examiner

PROCESSING METHOD AND APPARATUS FOR DEFENDING AGAINST SHARED STORAGE SIDE CHANNEL ATTACKS, AND ELECTRONIC DEVICE

CROSS-REFERENCES TO RELATED APPLICATIONS

The application claims the benefit of Chinese Patent Application No. 202111530184.9 filed on Dec. 14, 2021 in the China National Intellectual Property Administration, the disclosure of which is incorporated herein by reference in its entirety.

TECHNICAL FIELD

The present application provides the technical field of computers, and in particular to a processing method and apparatus for defending against shared storage side channel attacks, an electronic device and a computer-readable storage medium.

BACKGROUND

Side channel attacks based on the shared hardware are a big threat to the host data security, among which side channel attacks based on last level caches (LLCs) and side channel attacks based on dynamic random access memories (DRAMs) are common. In the increasingly popular cloud computing environment of infrastructure as a service (IaaS) and platform as a service (PaaS), the virtual machines of different tenants are generally run on a same physical machine, so that the hazards from LLC side channel attacks and DRAM side channel attacks are further aggravated. Therefore, how to defend side channel attacks becomes an urgent problem to be solved.

SUMMARY

In accordance with first aspect of the present application, a processing method for defending against shared storage side channel attacks is provided, including steps of: receiving, by a clock thread, a first request to acquire time information from an attack thread, the clock thread including a thread that processes timing programs, the attack thread including a thread that performs side channel attacks; acquiring first time information by the clock thread, the first time information including a time point when the first request is received; obfuscating the first time information to obtain second time information; and transmitting, by the clock thread, the second time information to the attack thread, so that the attack thread performs side channel attacks based on the second time information.

Optionally, the receiving, by a clock thread, a first request to acquire time information from an attack thread includes: acquiring the first request from a first cache corresponding to the attack thread; transmitting the first request to a first hardware circuit, the first hardware circuit supporting a preset protocol; and transmitting, by the first hardware circuit, the first request to a second cache corresponding to the clock thread.

Optionally, the acquiring first time information by the clock thread includes: acquiring the first time information by the second cache corresponding to the clock thread.

Optionally, the obfuscating the first time information to obtain second time information includes: performing a time addition or subtraction operation on the first time information to obtain the second time information; wherein the duration corresponding to the time addition or subtraction operation is randomly determined.

Optionally, after the obfuscating the first time information to obtain second time information, the processing method further includes: caching the second time information to the second cache corresponding to the clock thread; and the transmitting, by the clock thread, the second time information to the attack thread includes: acquiring the second time information from the second cache, and transmitting the second time information to the first hardware circuit; and transmitting, by the first hardware circuit, the second time information to the first cache, and acquiring, by the attack thread, the second time information from the first cache.

Optionally, the preset protocol includes a cache consistency protocol.

In accordance with second aspect of the present application, a processing apparatus for defending against shared storage side channel attacks is provided, including:
a receiving module configured to receive, by a clock thread, a first request to acquire time information from an attack thread, the clock thread including a thread that processes timing programs, the attack thread including a thread that performs side channel attacks;
an acquisition module configured to acquire first time information by the clock thread, the first time information including a time point when the first request is received;
an obfuscation module configured to obfuscate the first time information to obtain second time information; and
a transmitting module configured to transmit, by the clock thread, the second time information to the attack thread, so that the attack thread performs side channel attacks based on the second time information.

Optionally, the receiving module is specifically configured to: acquire the first request from a first cache corresponding to the attack thread; transmit the first request to a first hardware circuit, the first hardware circuit supporting a preset protocol; and transmit, by the first hardware circuit, the first request to a second cache corresponding to the clock thread.

In accordance with another aspect of the present application, an electronic device is provided, including:
one or more processors;
a memory; and
one or more application programs, wherein the one or more application programs are stored in the memory and configured to be executed by the one or more processors, and the one or more programs are configured to execute the processing method for defending against shared storage side channel attacks described in the first aspect.

For example, in accordance with a third aspect of the present application, an electronic device is provided, including: a processor, a memory, a communication interface and a communication bus, wherein the processor, the memory and the communication interface communicate with each other through the communication bus; and the memory is configured to store at least one executable instruction that cause the processor to execute the operations corresponding to the processing method for defending against shared storage side channel attacks described in the first aspect of the present application.

In accordance with still another aspect of the present application, a computer-readable storage medium is provided, wherein computer programs, when executed by a processor, implement the processing method for defending against shared storage side channel attacks described in the first aspect.

For example, in accordance with a fourth aspect of the embodiments of the present application, a computer-readable storage medium is provided. The computer-readable storage medium has computer programs stored thereon that, when executed by a processor, implement the processing method for defending against shared storage side channel attacks described in the first aspect of the present application.

In accordance with one aspect of the present application, a computer program product or computer program is provided, including computer instructions that are stored in a computer-readable storage medium. A processor of a computer device reads the computer instructions from the computer-readable storage medium, and the processor executes the computer instructions, so that the computer device executes the method provided in various optional implementations of the first aspect.

BRIEF DESCRIPTION OF THE DRAWINGS

In order to explain the technical solutions of the embodiments of the present application more clearly, the drawings to be used in the description of the embodiments of the present application will be briefly illustrated below.

DETAILED DESCRIPTION

Figure 1:
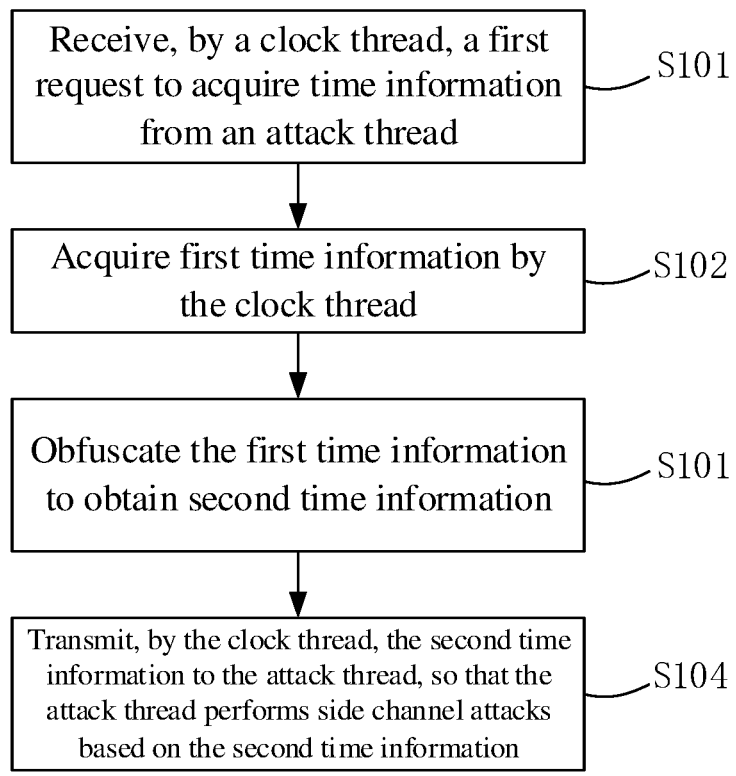
FIG. 1 is a flowchart of a processing method for defending against shared storage side channel attacks according to an embodiment of the present application.

The embodiments of the present application will be described below with reference to the drawings in the present application. It should be understood that the implementations described below with reference to the drawings are exemplary descriptions for explaining the technical solutions of the embodiments of the present application, and are not intended to limit the technical solutions of the embodiments of the present application.

It should be understood by those skilled in the art that singular forms "a", "an", "the" and "said" used herein may include plural forms as well, unless otherwise stated. It should be further understood that the term "comprise/comprising" or "include/including" used in the embodiments of the present application means that the corresponding features may be implemented as the presented features, information, data, steps, operations, elements and/or components, but does not exclude that they are implemented as other features, information, data, steps, operations, elements, components and/or combinations thereof supported in the art. It should be understood that, when an element is referred to as being "connected to" or "coupled to" to another element, this element may be directly connected or coupled to the another element, or this element may be connected to the another element through an intervening element. In addition, the "connection" or "coupling" as used herein may include wireless connection or coupling. As used herein, the term "and/or" indicates at least one of the items defined by this term. For example, "A and/or B" may be implemented as "A", "B", or "A and B".

To make the objectives, technical solutions and advantages of the present application clearer, the implementations of the present application will be further described below in detail with reference to the drawings.

Firstly, several terms involved in the present application will be introduced and explained below.

Side channel attacks (SCA), also known as edge channel attack, have the core idea of acquiring cipher text information by using various leakage information generated during the operation of the encryption software or hardware. In a narrow sense, the side channel attacks specifically refer to non-invasive attacks against the cryptographic algorithm, which crack the cryptographic algorithm through the leakage of the side channel information of the encryption electronic device during its operation process. The side channel attacks in the narrow sense mainly include timing attacks, energy analysis attacks, electromagnetic analysis attacks or the like against the cryptographic algorithm. In a broad sense, there are a variety of attacks. For example, the side channel attacks against keyboard tapping contents include sound analysis attacks, electromagnetic analysis attacks, attacks (WiKey) through the WiFi channel state, attacks through the kernel usage state and process information, etc.

Threads are the minimum units in which the operating unit can perform operation scheduling. The threads are included in a process, and are the actual operation units in the process. One thread refers to a single-order control flow in the process. Multiple threads may be concurrent in one process, and each thread concurrently executes a different task. In the Unix System V and SunOS, the processes are also referred as lightweight processes. However, the lightweight processes more often refer to kernel threads, while the user threads are referred to as threads. The threads are basic units that are separately scheduled and dispatched. The threads may be kernel threads scheduled by the kernel of the operating system, e.g., Win32 threads; user threads scheduled by user processes, e.g., POSIX Threads in the Linux platform; or, threads jointly scheduled by both the kernel and user processes, e.g., threads in Windows 7.

The processing method and apparatus for defending against shared storage side channel attacks, the electronic device and the computer-readable storage medium provided by the present application are intended to solve the above technical problems in the prior art.

The technical solutions of the present application and how to solve the above technical problems by the technical solutions of the present application will be described below in detail by specific embodiments. The following specific embodiments can be combined with each other, and the same or similar concepts or processes may not be repeated in some embodiments. The embodiments of the present application will be described below with reference to the drawings.

With reference to FIG. 1, an embodiment of the present application provides a method for defending against shared storage side channel attacks. Optionally, the method is applied to an electronic device or a processor of the electronic device. The processor may be a CPU, a graphics processing unit (GPU), etc. For convenience of description, the embodiment of the present application will be described later by taking the method being applied to a processor as an example. However, it should be understood that this does not constitute any limitation to the application scenario of the embodiment of the present application.

This method may include the following steps.

At S101, a first request to acquire time information from an attack thread is received by a clock thread, the clock thread including a thread that processes timing programs, the attack thread including a thread that performs side channel attacks.

The processing method for defending against shared storage side channel attacks provided in this embodiment of the present application may be applied in a side channel attack scenario. Optionally, in the embodiment of the present application, the side channel attacks may be side channel attacks based on the last level cache (LLC), or side channel attacks based on the dynamic random access memory (DRAM).

In the side channel attack process, the attack thread that performs side channel attacks needs to acquire time information, and then completes side channel attacks in virtue of the acquired time information.

Specifically, the attack thread may acquire time information from a clock thread that processes timing programs. In the embodiment of the present application, it is possible to transmit a first request to acquire time information to the clock thread through the attack thread and then receive the first request through the clock thread.

The first request may be directly transmitted to the clock thread. Optionally, the first request may also be stored in a first cache corresponding to the attack thread. The first cache may be a local high-speed cache of the attack thread, i.e., a local Cache of the attack thread. Then, the first request is acquired from the first cache and then transmitted to a first hardware circuit that supports a preset protocol; and, the first request is transmitted to a second cache corresponding to the clock thread through the first hardware circuit. That is, the first request may be received through the second cache corresponding to the clock thread. The second cache may be a local high-speed cache of the clock thread, i.e., a local Cache of the clock thread. The preset protocol may be a cache consistency protocol.

At S102, first time information is acquired by the clock thread, the first time information including a time point when the first request is received.

Specifically, the first time information may be stored in the second cache corresponding to the clock thread, so the first time information may be acquired from the second cache through the clock thread, wherein the first time information is a time point when the first request is received.

In the side channel attack process, the attack thread needs to acquire the extract time difference before and after the related operation of the side channel attack (the related operation includes memory access or other operations). Therefore, in the embodiment of the present application, the processing operation of acquiring, by the attack thread, time information from the clock thread may include two times. That is, the acquisition of time information from the clock thread is performed before and after the related operation of the channel attack, respectively.

Figure 2:
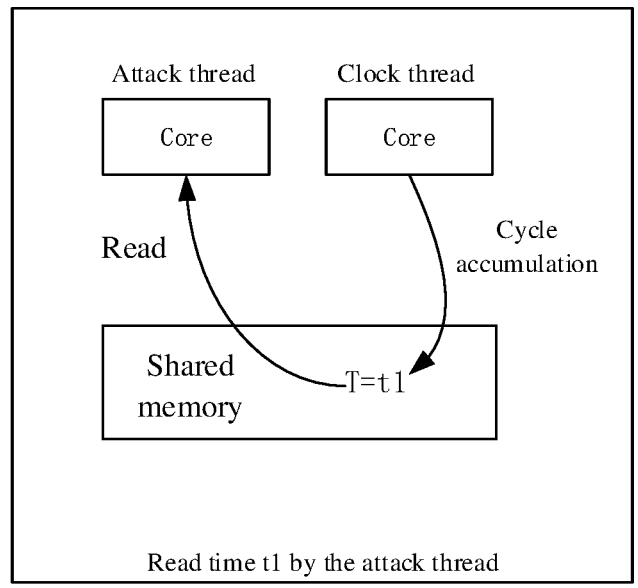
FIG. 2 is a first principle diagram of the processing method for defending against shared storage side channel attacks according to an embodiment of the present application.
Figure 3:
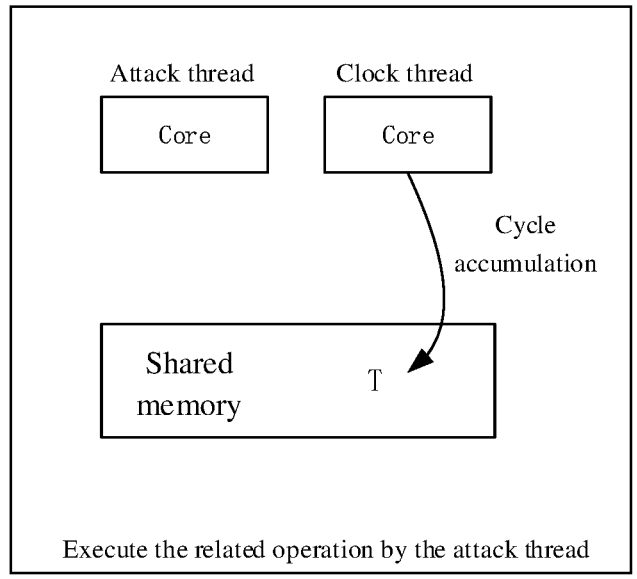
FIG. 3 is a second principle diagram of the processing method for defending against shared storage side channel attacks according to an embodiment of the present application.
Figure 4:
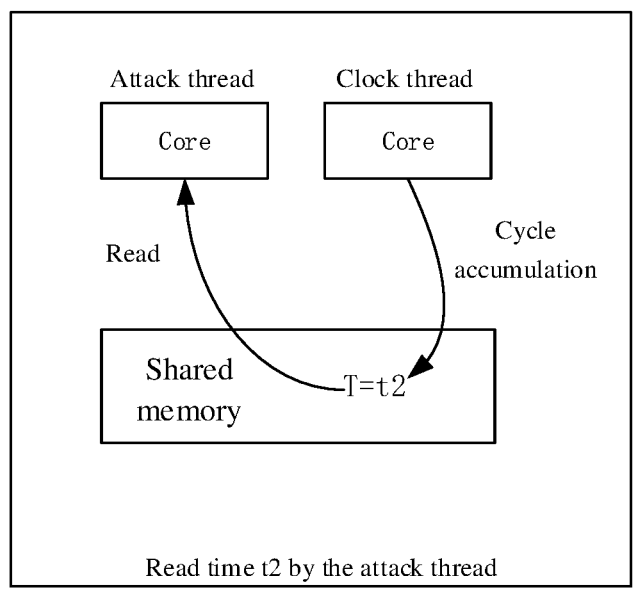
FIG. 4 is a third principle diagram of the processing method for defending against shared storage side channel attacks according to an embodiment of the present application.

As an example, with reference to FIGS. 2 to 4, the principle of acquiring, by the attack thread, the time information to perform side channel attack will be described.

Specifically, the attack thread and the clock thread may share a time variable T, i.e., the time information in the embodiment of the present application. The time variable T changes continuously as time goes on. The attack thread may execute the following three processing steps: (1) acquiring time information t1; (2) executing the related operation of the channel attack, e.g., memory access; and, (3) acquiring time information t2 again. To sum up, the time for the attack thread to perform the related operation is t2−t1.

At S103, the first time information is obfuscated to obtain second time information.

In order to interfere with the side channel attack of the attack thread, in the embodiment of the present application, the first time information may be obfuscated to obtain inaccurate second time information, so that the attack thread cannot successfully complete a side channel attack when it performs side channel attacks based on the inaccurate time information.

The obfuscation may include a time addition or subtraction operation on the first time information. Optionally, since the attack thread needs to acquire time information for two times during the side channel attack and calculate the difference (i.e., t2−t1) of the time information acquired for two times, in order to make the acquired time difference inaccurate to interfere with the side channel attack of the attack thread, in the embodiment of the present application, the duration of the time addition or subtraction operation may be randomly determined. In this way, the second time information obtained after adding or subtracting t1 is inaccurate time information; the second time information obtained after adding or subtracting t2 is also inaccurate time information; and, the duration of adding or subtracting t1 and t2 is randomly determined. Therefore, t2−t1 is also inaccurate.

At S104, the second time information is transmitted to the attack thread by the clock thread, so that the attack thread performs side channel attacks based on the second time information.

Optionally, in the process of transmitting the second time information to the attack thread, the second time information may be directly transmitted to the attack thread. In addition, it is also possible that the second time information is cached to the second cache corresponding to the clock thread; then, the second time information is acquired from the second cache and then transmitted to the first hardware circuit; and, the second time information is transmitted to the first cache through the first hardware circuit, and the attack thread acquires the second time information from the first cache.

In the embodiment of the present application, first time information is acquired by a clock thread, and the first time information is obfuscated to obtain second time information; and, the second time information is transmitted to an attack thread by a clock thread. Since the second time information acquired by the attack thread is obfuscated, that is, the second time information is inaccurate, the attack thread cannot successfully complete a side channel attack when it performs side channel attacks based on the inaccurate time information, so that the system can be protected.

In one embodiment of the present application, the receiving, by a clock thread, a first request to acquire time information from an attack thread includes:
acquiring the first request from a first cache corresponding to the attack thread;
transmit the first request to a first hardware circuit, the first hardware circuit supporting a preset protocol; and
transmit, by the first hardware circuit, the first request to a second cache corresponding to the clock thread.

In one embodiment of the present application, the acquiring first time information by the clock thread includes:
acquiring the first time information by the second cache corresponding to the clock thread.

Specifically, the interaction scenario of the time information between the attack thread and the clock thread may be explained with reference to FIGS. 5 to 8.

Figure 5:
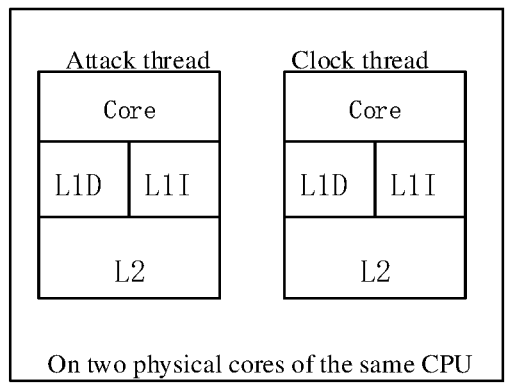
FIG. 5 is a fourth principle diagram of the processing method for defending against shared storage side channel attacks according to an embodiment of the present application.
Figure 6:
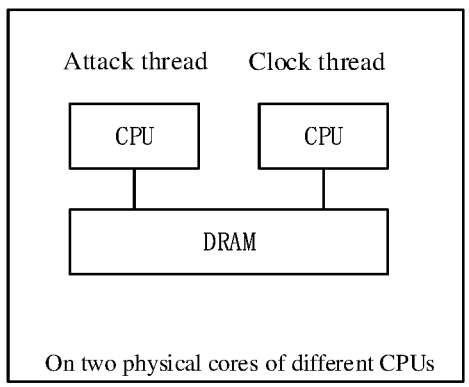
FIG. 6 is a fifth principle diagram of the processing method for defending against shared storage side channel attacks according to an embodiment of the present application.

Optionally, in the embodiment of the present application, the attack thread and the clock thread may be run on two physical kernels of the same CPU, respectively, i.e., the situation shown in FIG. 5. In addition, the attack thread and the clock thread may also be run on two physical kernels of two CPUs, respectively, i.e., the situation shown in FIG. 6.

Figure 7:
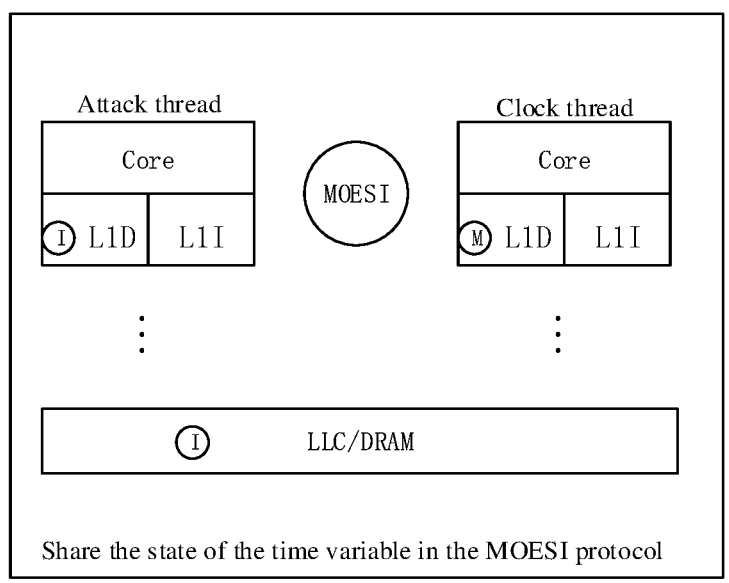
FIG. 7 is a sixth principle diagram of the processing method for defending against shared storage side channel attacks according to an embodiment of the present application.

In the two situations, it is necessary to realize time information interaction based on the cache consistency protocol. FIG. 7 shows the state of the time information in the MOESI protocol in the situation where the attack thread and the clock thread are run on two physical kernels.

Figure 8:
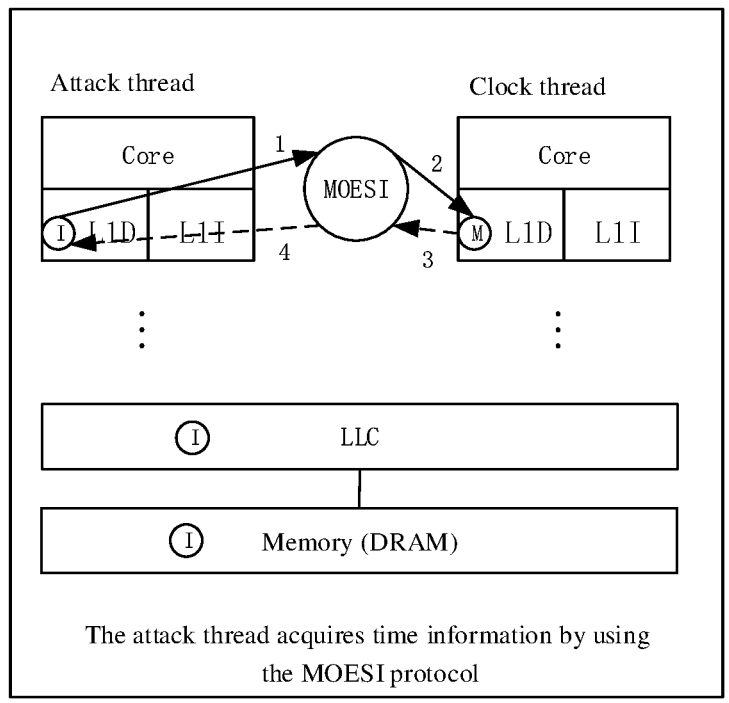
FIG. 8 is a seventh principle diagram of the processing method for defending against shared storage side channel attacks according to an embodiment of the present application.

In some embodiments, the time information interaction process of the attack thread and the clock thread may be shown in FIG. 8.

(1) A first request to acquire first time information is transmitted by the attack thread. The first request may be stored in a first cache corresponding to the attack thread, wherein the first cache may be a local high-speed cache of the attack thread, i.e., a local Cache of the attack thread. Then, the first request is acquired from the first cache corresponding to the attack thread, and the first request is then transmitted to a first hardware circuit, wherein the first hardware circuit supports a preset protocol, and the preset protocol may be a MOSEI protocol.

(2) The first request is transmitted to a second cache corresponding to the clock thread by the first hardware circuit. The second cache may be a local high-speed cache of the clock thread, i.e., a local Cache of the clock thread.

(3) The first time information is acquired by the second cache corresponding to the clock thread. Then, the first time information is cached to the second cache corresponding to the clock thread; and, the first time information is acquired from the second cache and then transmitted to the first hardware circuit.

(4) The first time information is transmitted to the first cache by the first hardware circuit, and the first time information is acquired from the first cache by the attack thread.

In one embodiment of the present application, the obfuscating the first time information to obtain second time information includes:
performing a time addition or subtraction operation on the first time information to obtain the second time information;
wherein the duration corresponding to the time addition or subtraction operation is randomly determined.

In one embodiment of the present application, after the obfuscating the first time information to obtain second time information, the processing method further includes:
caching the second time information to the second cache corresponding to the clock thread; and
the transmitting, by the clock thread, the second time information to the attack thread includes:
acquiring the second time information from the second cache, and transmitting the second time information to the first hardware circuit; and
transmitting, by the first hardware circuit, the second time information to the first cache, and acquiring, by the attack thread, the second time information from the first cache.

Figure 9:
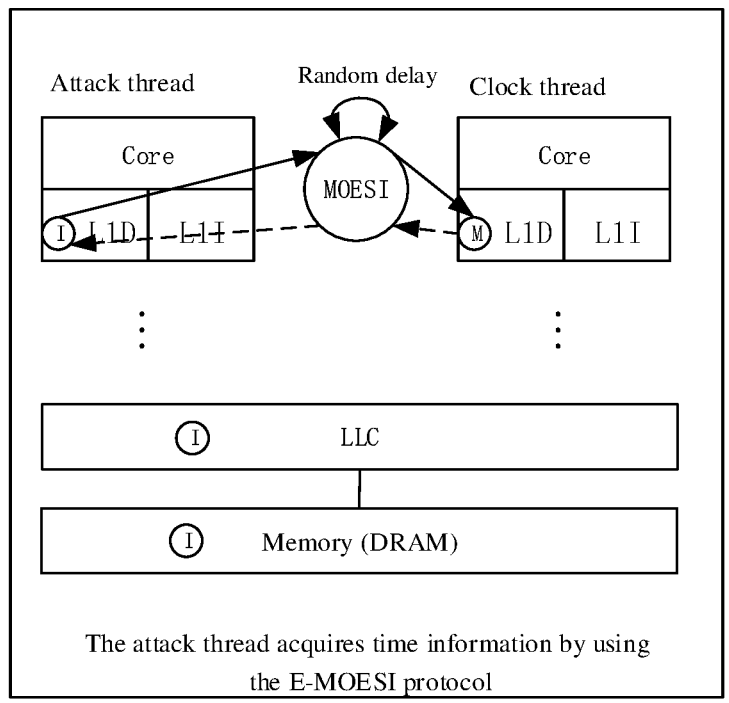
FIG. 9 is an eighth principle diagram of the processing method for defending against shared storage side channel attacks according to an embodiment of the present application.

Specifically, in order to make the time information acquired by the attack thread inaccurate to interfere with the side channel attack process, another embodiment of the present application provides a process of acquiring time information based on an E-MOESI protocol, specifically as shown in FIG. 9.

(1) A first request to acquire first time information is transmitted by the attack thread. The first request may be stored in a first cache corresponding to the attack thread. Then, the first request is acquired form the first cache corresponding to the attack thread, and then transmitted to a first hardware circuit. The first hardware circuit supports a preset protocol, and the preset protocol may be an E-MOESI protocol, i.e., a cache consistency protocol.

(2) The first request is transmitted to a second cache corresponding to the clock thread by the first hardware circuit.

(3) The first time information is acquired by the second cache corresponding to the clock thread. A time addition or subtraction operation is performed on the first time information to obtain second time information. The duration corresponding to the time addition or subtraction operation is randomly determined.

It is to be noted that, as shown in FIG. 9, in some embodiments of the present application, the operation of adding or subtracting the first time information may also be realized by delaying for a period of time after the first request is transmitted to the first hardware circuit and then transmitting the first request to the second cache corresponding to the clock thread. The duration of the delay is randomly determined.

(4) The second time information is cached to the second cache corresponding to the clock thread. The second time information is acquired from the second cache, and the second time information is transmitted to the first hardware circuit.

(5) The second time information is transmitted to the first cache by the first hardware circuit, and the attack thread acquires the second time information from the first cache.

In the embodiment of the present application, first time information is acquired by a clock thread, and the first time information is obfuscated to obtain second time information; and, the second time information is transmitted to an attack thread by a clock thread. Since the second time information acquired by the attack thread is obfuscated, that is, the second time information is inaccurate, the attack thread cannot successfully complete a side channel attack when it performs side channel attacks based on the inaccurate time information, so that the system can be protected.

Figure 10:
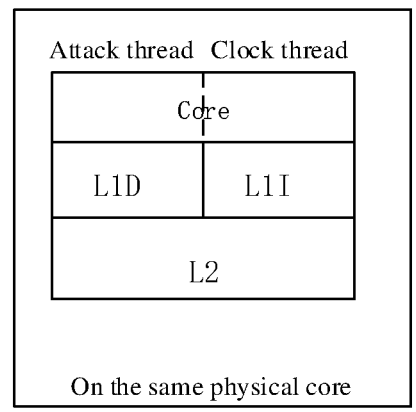
FIG. 10 is a ninth principle diagram of the processing method for defending against shared storage side channel attacks according to an embodiment of the present application.

In some embodiments of the present application, as shown in FIG. 10, the attack thread and the clock thread may also be run on two logic kernels of the same physical kernel by a hyper-threading technology. In this case, to interfere with the side channel attack process so that the time information interaction cannot be realized between the attack thread and the clock thread and the attack thread cannot successfully complete channel attack, in the embodiment of the present application, the attack thread and the clock thread may be scheduled to different physical kernels.

Specifically, in a case where the hyper-threading technology of the CPU is activated, when a thread needs to be scheduled to a certain physical kernel, it is continuously detected whether this thread shares a writable memory with other threads that are running on this physical kernel. If the writable memory is shared between threads, it is attempted to schedule this thread to this physical kernel; and, if there is no available physical kernel currently, a schedulable physical kernel will be waited.

Generally, there are two types of threads sharing the writable memory: 1. a set of threads that share an ancestor process, i.e., determining whether two threads belong to a same process; and, 2. a set of threads that share the writable memory by using a kernel interface.

Figure 11:
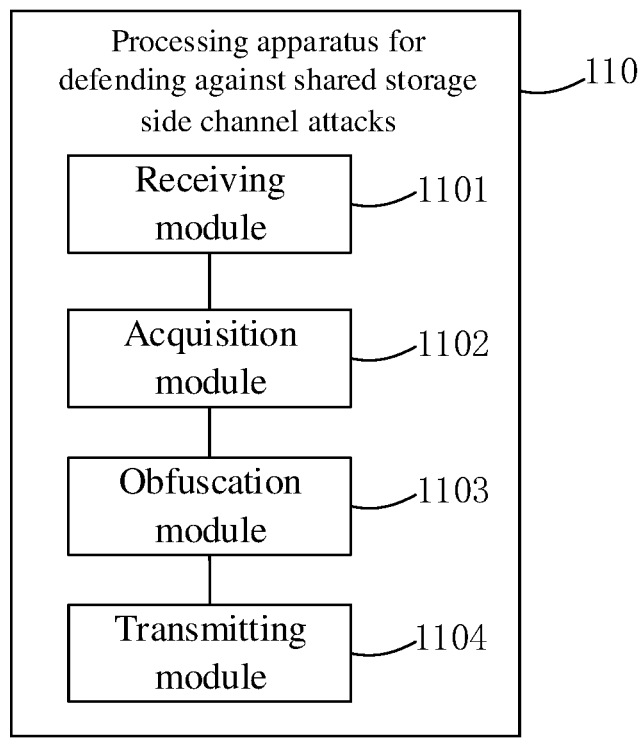
FIG. 11 is a schematic structure diagram of a processing apparatus for defending against shared storage side channel attacks according to an embodiment of the present application.

An embodiment of the present application provides a processing apparatus for depending shared storage side channel attacks. As shown in FIG. 11, the processing apparatus 110 for depending shared storage side channel attacks may include: a receiving module 1101, an acquisition module 1102, an obfuscation module 1103 and a transmitting module 1104, wherein:
  the receiving module 1101 is configured to receive, by a clock thread, a first request to acquire time information from an attack thread, the clock thread including a thread that processes timing programs, the attack thread including a thread that performs side channel attacks;
  the acquisition module 1102 is configured to acquire first time information by the clock thread, the first time information including a time point when the first request is received;
  the obfuscation module 1103 is configured to obfuscate the first time information to obtain second time information; and
  the transmitting module 1104 is configured to transmit, by the clock thread, the second time information to the attack thread, so that the attack thread performs side channel attacks based on the second time information.

In one embodiment of the present application, the receiving module is specifically configured to: acquire the first request from a first cache corresponding to the attack thread; transmit the first request to a first hardware circuit, the first hardware circuit supporting a preset protocol; and transmit, by the first hardware circuit, the first request to a second cache corresponding to the clock thread.

In one embodiment of the present application, the acquiring first time information by the clock thread includes: acquiring the first time information by the second cache corresponding to the clock thread.

In one embodiment of the present application, the obfuscation module 1103 is specifically configured to perform a time addition or subtraction operation on the first time information to obtain the second time information; wherein the duration corresponding to the time addition or subtraction operation is randomly determined.

In one embodiment of the present application, the obfuscation module 1103 is specifically configured to cache the second time information to the second cache corresponding to the clock thread; and
  the transmitting module 1104 is specifically configured to: acquire the second time information from the second cache, and transmit the second time information to the first hardware circuit; and transmit, by the first hardware circuit, the second time information to the first cache, and acquire, by the attack thread, the second time information from the first cache.

In one embodiment of the present application, the preset protocol includes a cache consistency protocol.

The apparatus in the embodiment of the present application can execute the method provided in the embodiments of the present application, and the implementation principles thereof are similar. The actions performed by the modules in the apparatus in the embodiment of the present application correspond to the steps in the method in the embodiment of the present application. For the detailed functional description of the modules in the apparatus, the reference can be made to the description of the corresponding method shown above, and the details will not be repeated here.

In the embodiment of the present application, first time information is acquired by a clock thread, and the first time information is obfuscated to obtain second time information; and, the second time information is transmitted to an attack thread by a clock thread. Since the second time information acquired by the attack thread is obfuscated, that is, the second time information is inaccurate, the attack thread cannot successfully complete a side channel attack when it performs side channel attacks based on the inaccurate time information, so that the system can be protected.

An embodiment of the present application provides an electronic device, including: a memory and a processor; and, at least one program, which is stored in the memory and configured to, when executed by the processor, implement the following compared with the prior art. In the embodiment of the present application, first time information is acquired by a clock thread, and the first time information is obfuscated to obtain second time information; and, the second time information is transmitted to an attack thread by a clock thread. Since the second time information acquired by the attack thread is obfuscated, that is, the second time information is inaccurate, the attack thread cannot successfully complete a side channel attack when it performs side channel attacks based on the inaccurate time information, so that the system can be protected.

Figure 12:
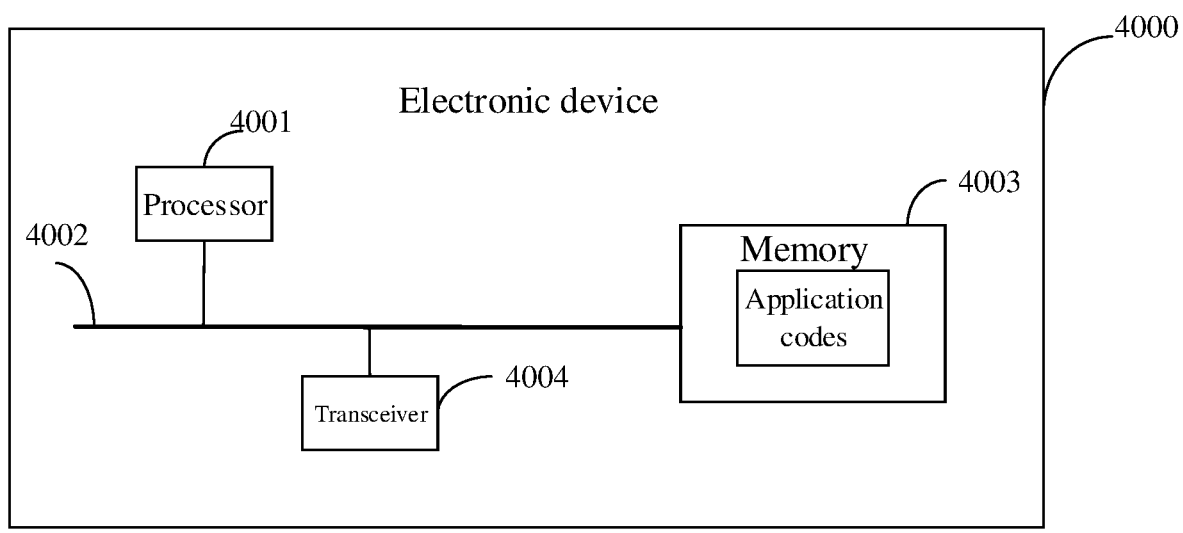
FIG. 12 is a schematic structure diagram of an electronic device for defending against shared storage side channel attacks according to an embodiment of the present application.

In one optimal embodiment, an electronic device is provided, as shown in FIG. 12. The electronic device 4000 shown in FIG. 12 includes a processor 4001 and a memory 4003. The processor 4001 is connected to the memory 4003, for example, via a bus 4002. Optionally, the electronic device 4000 may further include a transceiver 4004. The transceiver 4004 may be configured for data interaction between the electronic device and other electronic devices, for example, transmitting data and/or receiving data, etc. It is to be noted that, in practical applications, the number of the transceiver 4004 is not limited to 1, and the structure of the electronic device 4000 does not constitute any limitations to the embodiments of the present application.

The processor 4001 may be a central processing unit (CPU), a general-purpose processor, a digital signal processor (DSP), an application specific integrated circuit (ASIC), a field programmable gate array (FPGA) or other programmable logic devices, transistor logic devices, hardware components or any combination thereof. The processor may implement or execute various exemplary logic blocks, modules and circuits described in the disclosure of the present application. The processor 4001 may also be a combination for realizing a computing function, for example, a combination of one or more microprocessors, a combination of DSPs and microprocessors, etc.

The bus 4002 may include a passageway for transferring information between the above components. The bus 4002 may be a peripheral component interconnect (PCI) bus, an extended industry standard architecture (EISA) bus, etc. The bus 4002 may be classified into an address bus, a data bus, a control bus, etc. For ease of expression, the bus is expressed by only one bold line in FIG. 12, but it does not mean that there is only one bus or one type of buses.

The memory 4003 may be, but not limited to, read only memories (ROMs) or other types of static storage devices capable of storing static information and instructions, random access memories (RAMs) or other types of dynamic storage devices capable of storing information and instructions, or electrically erasable programmable read only memories (EEPROMs), compact disc read only memories (CD-ROMs) or other optical disk storages, optical disc storages (including compact discs, laser discs, optical discs, digital versatile optical discs, Blu-ray discs, etc.), magnetic disk storage mediums or other magnetic storage devices, or any other mediums that can be used to carry or store desired program codes in form of instructions or data structures and can be accessed by computers, but not limited to this.

The memory 4003 is configured to store application codes (computer programs) for executing the solutions in the present application and is controlled and executed by the processor 4001. The processor 4001 is configured to execute the application codes stored in the memory 4003 to implement the contents in the above method embodiments.

The electronic device includes, but not limited to, a mobile phone, a notebook computer, a multimedia player, a desktop computer, etc.

An embodiment of the present application provides a computer-readable storage medium having computer programs stored thereon that, when run on a computer, cause the computer to execute the corresponding contents in the above method embodiments.

In the embodiment of the present application, first time information is acquired by a clock thread, and the first time information is obfuscated to obtain second time information; and, the second time information is transmitted to an attack thread by a clock thread. Since the second time information acquired by the attack thread is obfuscated, that is, the second time information is inaccurate, the attack thread cannot successfully complete a side channel attack when it performs side channel attacks based on the inaccurate time information, so that the system is protected.

The terms such as "first", "second", "third", "fourth", "1" and "2" (if any) in the specification and claims of the present application and the drawings are used to distinguish similar objects, and are not necessarily used to describe a particular order or precedence. It should be understood that the used data may be used interchangeably if appropriate, so that the embodiments of the present application described herein may be implemented in an order other than the orders illustrated or described herein.

It should be understood that, although the operation steps are indicated by arrows in the flowcharts of the embodiments of the present application, the implementation order of these steps is not limited to the order indicated by the arrows. Unless otherwise explicitly stated herein, in some implementation scenarios of the embodiments of the present application, the implementation steps in the flowcharts may be executed in other orders as required. In addition, depending on practical implementation scenarios, some or all of the steps in the flowcharts may include a plurality of sub-steps or a plurality of stages. Some or all of these sub-steps or stages may be executed at the same moment, and each of these sub-steps or stages may be separately executed at a different moment. When each of these sub-steps or stages is executed at a different moment, the execution order of these sub-steps or stages may be flexibly configured as required, and will not be limited in the embodiments of the present application.

The foregoing description merely shows the optional implementations of some implementation scenarios of the present application. It should be noted that, for those skilled in the art, without departing from the technical idea of the solutions of the present application, other similar implementation means based on the technical idea of the present application shall also fall into the protection scope of the embodiments of the present application.

What is claimed is:

1. A processing method for defending against shared storage side channel attacks, comprising:
   receiving, by a clock thread, a first request to acquire time information from an attack thread, the clock thread comprising a thread that processes timing programs, the attack thread comprising a thread that performs side channel attacks;
   acquiring first time information by the clock thread, the first time information comprising a time point when the first request is received;
   obfuscating the first time information to obtain second time information; and
   transmitting, by the clock thread, the second time information to the attack thread, so that the attack thread performs side channel attacks based on the second time information.

2. The processing method for defending against shared storage side channel attacks according to claim 1, wherein the receiving, by a clock thread, a first request to acquire time information from an attack thread comprises:

acquiring the first request from a first cache corresponding to the attack thread;
transmitting the first request to a first hardware circuit, the first hardware circuit supporting a preset protocol; and
transmitting, by the first hardware circuit, the first request to a second cache corresponding to the clock thread.

3. The processing method for defending against shared storage side channel attacks according to claim 2, wherein the acquiring first time information by the clock thread comprises:
acquiring the first time information by the second cache corresponding to the clock thread.

4. The processing method for defending against shared storage side channel attacks according to claim 2, after the obfuscating the first time information to obtain second time information, further comprising:
caching the second time information to the second cache corresponding to the clock thread; and
the transmitting, by the clock thread, the second time information to the attack thread comprises:
acquiring the second time information from the second cache, and transmitting the second time information to the first hardware circuit; and
transmitting, by the first hardware circuit, the second time information to the first cache, and acquiring, by the attack thread, the second time information from the first cache.

5. The processing method for defending against shared storage side channel attacks according to claim 2, wherein the preset protocol comprises a cache consistency protocol.

6. The processing method for defending against shared storage side channel attacks according to claim 1, wherein the obfuscating the first time information to obtain second time information comprises:
performing a time addition or subtraction operation on the first time information to obtain the second time information;
wherein the duration corresponding to the time addition or subtraction operation is randomly determined.

7. An electronic device, comprising:
one or more processors;
a memory; and
one or more application programs, wherein the one or more application programs are stored in the memory and configured to be executed by the one or more processors, and the one or more programs are configured to execute a processing method for defending against shared storage side channel attacks comprising:
receiving, by a clock thread, a first request to acquire time information from an attack thread, the clock thread comprising a thread that processes timing programs, the attack thread comprising a thread that performs side channel attacks;
acquiring first time information by the clock thread, the first time information comprising a time point when the first request is received;
obfuscating the first time information to obtain second time information; and
transmitting, by the clock thread, the second time information to the attack thread, so that the attack thread performs side channel attacks based on the second time information.

8. The electronic device according to claim 7, wherein the receiving,
by a clock thread, a first request to acquire time information from an attack thread comprises:
acquiring the first request from a first cache corresponding to the attack thread;
transmitting the first request to a first hardware circuit, the first hardware circuit supporting a preset protocol; and
transmitting, by the first hardware circuit, the first request to a second cache corresponding to the clock thread.

9. The electronic device according to claim 8, wherein the acquiring first time information by the clock thread comprises:
acquiring the first time information by the second cache corresponding to the clock thread.

10. The electronic device according to claim 8, after the obfuscating the first time information to obtain second time information, the processing method for defending against shared storage side channel attacks further comprises:
caching the second time information to the second cache corresponding to the clock thread; and
the transmitting, by the clock thread, the second time information to the attack thread comprises:
acquiring the second time information from the second cache, and transmitting the second time information to the first hardware circuit; and
transmitting, by the first hardware circuit, the second time information to the first cache, and acquiring, by the attack thread, the second time information from the first cache.

11. The electronic device according to claim 8, wherein the preset protocol comprises a cache consistency protocol.

12. The electronic device according to claim 7, wherein the obfuscating the first time information to obtain second time information comprises:
performing a time addition or subtraction operation on the first time information to obtain the second time information;
wherein the duration corresponding to the time addition or subtraction operation is randomly determined.

13. A non-transitory computer-readable storage medium having computer programs stored thereon that, when executed by a processor, implement a processing method for defending against shared storage side channel attacks comprising:
receiving, by a clock thread, a first request to acquire time information from an attack thread, the clock thread comprising a thread that processes timing programs, the attack thread comprising a thread that performs side channel attacks;
acquiring first time information by the clock thread, the first time information comprising a time point when the first request is received;
obfuscating the first time information to obtain second time information; and
transmitting, by the clock thread, the second time information to the attack thread, so that the attack thread performs side channel attacks based on the second time information.

14. The non-transitory computer-readable storage medium according to claim 13, wherein the receiving, by a clock thread, a first request to acquire time information from an attack thread comprises:
acquiring the first request from a first cache corresponding to the attack thread;
transmitting the first request to a first hardware circuit, the first hardware circuit supporting a preset protocol; and
transmitting, by the first hardware circuit, the first request to a second cache corresponding to the clock thread.

15. The non-transitory computer-readable storage medium according to claim 14, wherein the acquiring first time information by the clock thread comprises:
acquiring the first time information by the second cache corresponding to the clock thread.

16. The non-transitory computer-readable storage medium according to claim 14, after the obfuscating the first time information to obtain second time information, the processing method for defending against shared storage side channel attacks further comprises:
caching the second time information to the second cache corresponding to the clock thread; and
the transmitting, by the clock thread, the second time information to the attack thread comprises:
acquiring the second time information from the second cache, and transmitting the second time information to the first hardware circuit; and
transmitting, by the first hardware circuit, the second time information to the first cache, and acquiring, by the attack thread, the second time information from the first cache.

17. The non-transitory computer-readable storage medium according to claim 14, wherein the preset protocol comprises a cache consistency protocol.

18. The non-transitory computer-readable storage medium according to claim 13, wherein the obfuscating the first time information to obtain second time information comprises:
performing a time addition or subtraction operation on the first time information to obtain the second time information;
wherein the duration corresponding to the time addition or subtraction operation is randomly determined.

* * * * *